United States Patent [19]

Pish

[11] Patent Number: 5,141,371
[45] Date of Patent: Aug. 25, 1992

[54] APPARATUS FOR LIFTING AND STORING AIRCRAFT

[76] Inventor: Paul J. Pish, 97 Marble Hill Ct., Schaumburg, Ill. 60193

[21] Appl. No.: 552,584

[22] Filed: Jul. 12, 1990

[51] Int. Cl.$^5$ ............................................. B64F 1/00
[52] U.S. Cl. .................................. 414/229; 244/114 R; 254/88
[58] Field of Search .................. 414/227–230; 254/88, 90; 244/114 R; 52/32, 64, 632

[56] References Cited

U.S. PATENT DOCUMENTS

| | | | |
|---|---|---|---|
| 1,987,376 | 1/1935 | Stearns | 414/230 |
| 2,962,980 | 12/1960 | Carrigan | 254/88 X |
| 3,216,530 | 11/1965 | Hunter | 254/88 X |
| 3,688,922 | 9/1972 | Klaus | 414/229 |
| 3,863,890 | 2/1975 | Ruffing | 254/88 X |
| 3,954,197 | 5/1976 | Dean | 244/114 R X |
| 4,077,607 | 3/1978 | Lovelady | 254/88 |
| 4,088,303 | 5/1978 | Aquila | 254/88 |
| 4,238,003 | 12/1980 | Hunter | 254/88 X |
| 4,486,006 | 12/1984 | Fawdry | 254/88 |
| 4,601,632 | 7/1986 | Agee | 414/537 |
| 4,697,392 | 10/1987 | Silzle | 244/114 R X |

FOREIGN PATENT DOCUMENTS

| | | | |
|---|---|---|---|
| 158735 | 10/1985 | European Pat. Off. | 244/114 R |
| 2101090 | 12/1972 | Fed. Rep. of Germany | 52/64 |
| 685029 | 7/1930 | France | 254/88 |

OTHER PUBLICATIONS

Photographs of a prototype used experimentally and a declaration of the inventor which explains the experimental use.

Primary Examiner—David A. Bucci
Attorney, Agent, or Firm—Keck, Mahin & Cate

[57] ABSTRACT

An inclining apparatus for lifting and storing aircraft in a stacked or tiered arrangement is provided to permit increased utilization of presently available hangar space. Aircraft are stored in upper and lower stowing positions. The apparatus is completely self-supporting and includes an inclining frame for loading and unloading aircraft from the upper stowing position. The apparatus is constructed to permit stowing or removal of an aircraft from either the upper or lower stowing positions without moving or disturbing the other aircraft stowed in the accompanying position.

18 Claims, 4 Drawing Sheets

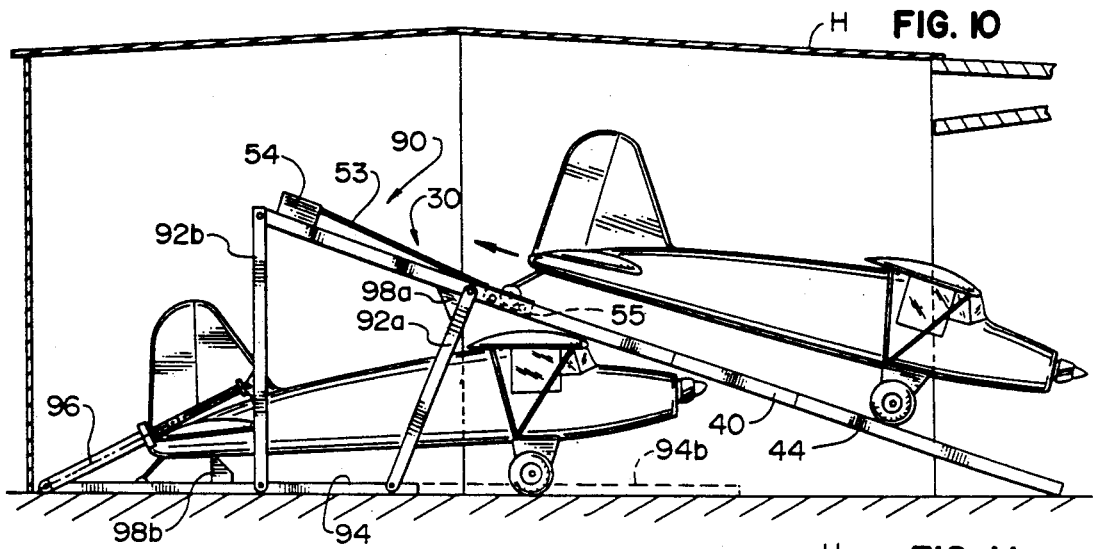
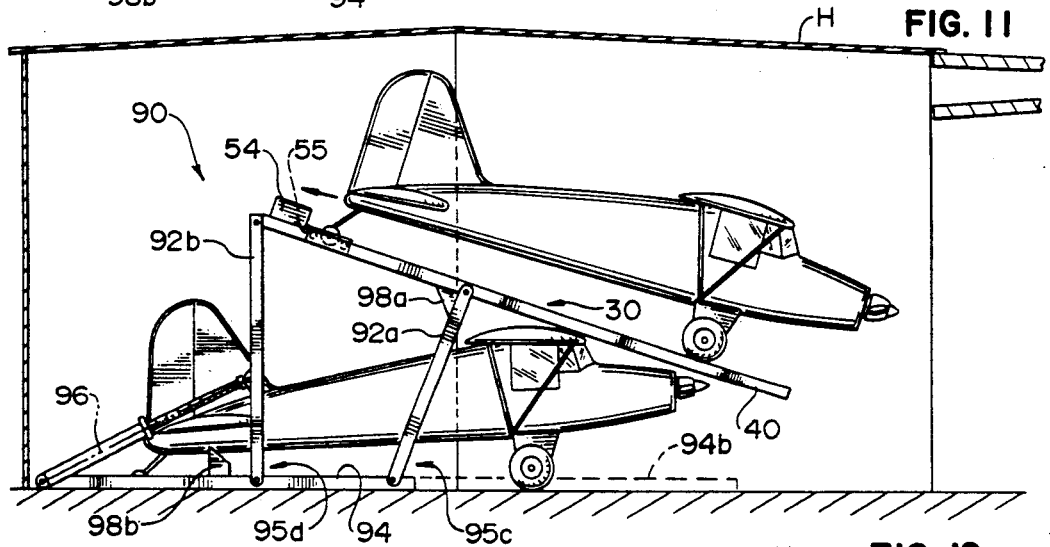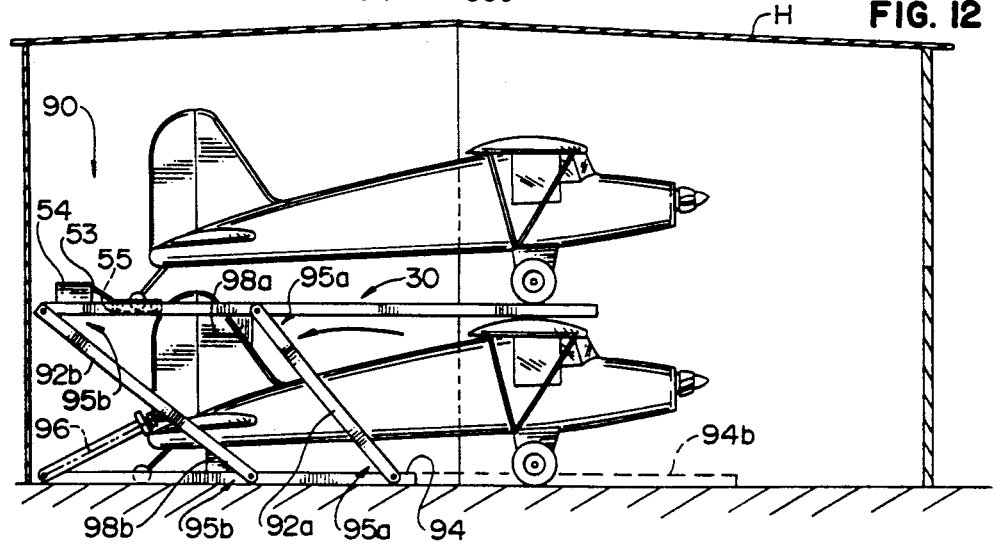

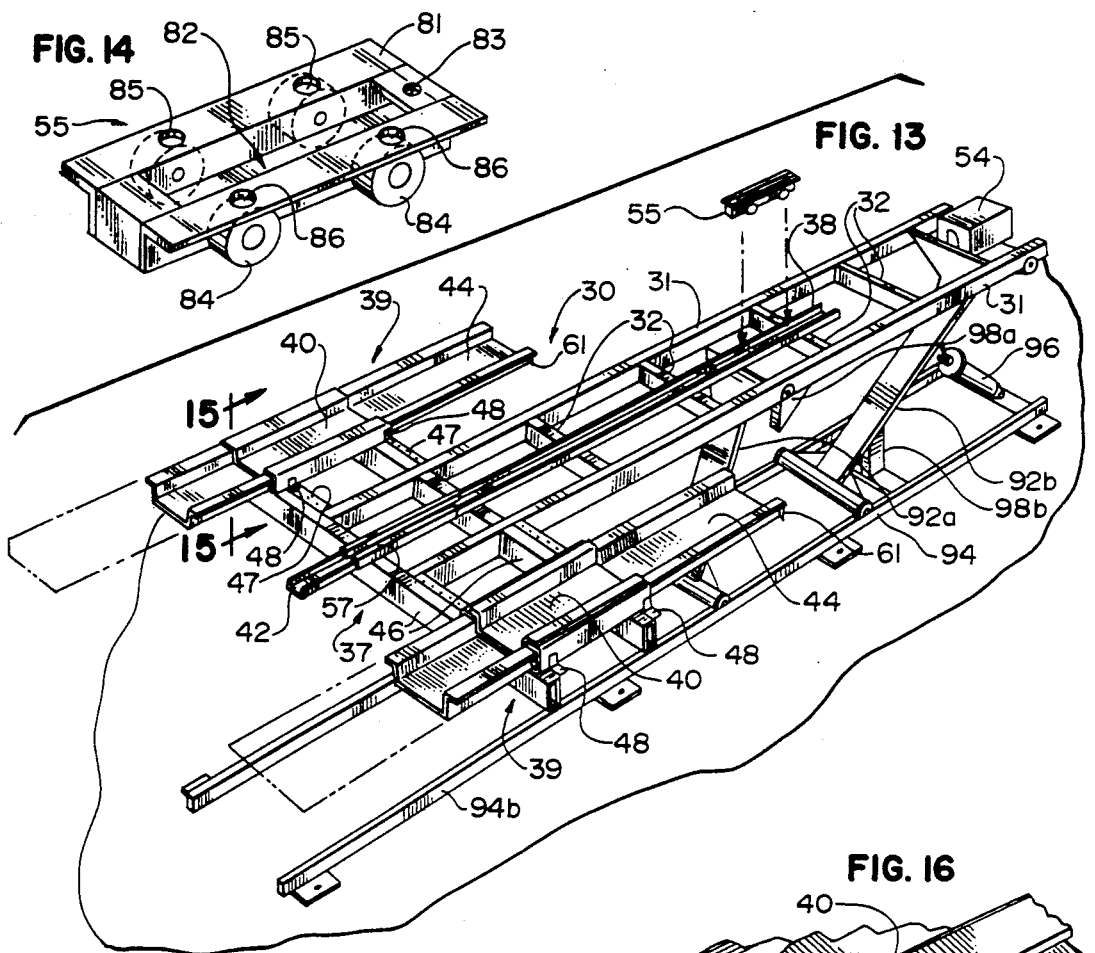
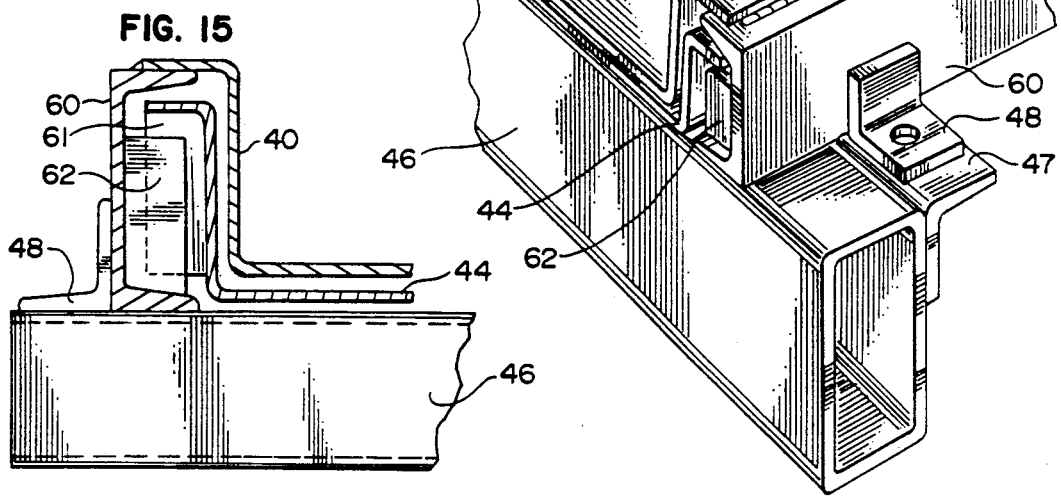

APPARATUS FOR LIFTING AND STORING AIRCRAFT

BACKGROUND OF THE INVENTION

The present invention relates to structures for lifting and storing aircraft. More particularly, the present invention relates to an apparatus for lifting and storing aircraft that includes an adjustability feature to permit storage of a variety of widths and types of aircraft. Moreover, this apparatus uses presently available hangar space more efficiently by allowing the storage of aircraft in a tiered arrangement.

Aircraft hangars must be large in order to accommodate the various dimensions of modern aircraft. Such variation in size requires hangars to have tall interior dimensions. When smaller aircraft are stored in these hangars, a vast amount of space above the aircraft is unused.

The present invention, which allows aircraft to be stored in a stacked or tiered arrangement, permits an increased utilization of this available hangar space. The invention effectively doubles the aircraft storage capacity of any given hangar.

The lift apparatus of the present invention stores the aircraft by parking the aircraft in an elevated position above the other aircraft. The apparatus pulls the aircraft into position and then utilizes a lift means to raise the aircraft.

The lift apparatus includes a retraction feature which allows access to the elevated aircraft without moving the conventionally-stored aircraft. The retraction feature also allows storage of the elevated aircraft in a position slightly to the rear of the conventionally-stored aircraft. This permits access and use of the conventionally-stored aircraft without requiring movement of the elevated aircraft.

In order to accommodate a variety of sizes and types of aircraft, the lift apparatus includes expansion means to allow storage of differing widths of aircraft. The frame includes laterally adjustable wheel track assemblies to permit usage of the apparatus with aircraft of various sized wheel bases.

The present invention utilizes a lift frame which, when in the inclined position, is in the nature of a ramp. However, this invention offers features beyond the ramp function. The lift feature of the present invention includes both upper and lower stowing positions so that aircraft can be stowed on the lift frame and underneath the lift frame simultaneously. Furthermore, the present invention permits loading and unloading of aircraft stowed in either the upper or lower stowing positions to be undertaken by a single person without moving or disturbing the aircraft already stowed in the accompanying stowing position of the apparatus. In addition, the apparatus is adjustable so that it can store a variety of aircraft sizes and types. These features allow more efficient utilization of the presently available hangar space through the stowing of aircraft in a stacked or tiered arrangement.

OBJECTS OF THE INVENTION

It is therefore an object of the present invention to provide a means of increasing aircraft hangar storage capacity with an adjustable lifting and storing means.

Another object is to provide an apparatus which stores aircraft in a stacked or tiered arrangement; thereby placing one aircraft above another in an upper and lower, that is, an elevated and conventional stowing arrangement.

It is another object to provide a storage apparatus which permits movement of either the upper or lower stowed aircraft without requiring movement of the accompanying aircraft.

It is still another object to provide an apparatus which allows movement of either the upper or lower stowed aircraft to be undertaken and completed by one person.

It is a further object to provide an apparatus which is fully self-supporting.

Other objects, features and advantages of the present invention will be apparent from the accompanying description and appended drawings.

SUMMARY OF THE INVENTION

In accordance with one embodiment of this invention, an apparatus for stowing aircraft is provided, which includes a frame structure that is pivotally attached to a rear support structure. A front support structure is attached to the frame structure. The front support structure is adjustable to move the frame structure, with the aircraft, into the elevated position. Stabilizing means are included in order to enhance lateral stability of this embodiment.

The frame structure includes three wheel track assemblies, two outer wheel track assemblies and a center wheel track assembly. The two outer wheel track assemblies are adjustable laterally of the frame to accommodate varying aircraft wheel bases. A center wheel track assembly accommodates a center wheel of the aircraft, irrespective of whether that center wheel is located in the front or the rear of the aircraft. Additionally, a wheel holding means is included in the form of a center wheel caddy. This wheel caddy retains the center wheel of the aircraft and is pulled by a cable from a winch during aircraft loading and is restrained by the cable and winch during aircraft unloading.

All three wheel track assemblies are retractable longitudinally of the frame structure. Such longitudinal adjustment allows movement of the frame structure over the wing of an aircraft stored in the conventional position.

A power winch is provided at the rear of the frame structure. The winch includes an extending cable to connect to the rear of the aircraft and pull the aircraft in a reverse direction onto the frame structure. The adjustment of the front structure is also mechanically powered to allow ease of elevation of the aircraft.

A second embodiment of the present invention is also provided in which the frame structure and rear support structure are movable. Instead of utilizing a powered lift mechanism with the front support structure, the mechanically powered lift, in the form of a powered jack, is attached to the rear support structure. The rear support is pivotally attached to a base and the entire frame and rear support, which together resemble a four-bar linkage, move forward and rearward to elevate or lower the support apparatus.

The front and rear support structures are disposed at relatively different angles with regard to the support frame and base. Such angular placement of the support structures permits the lift frame to be raised or lowered while an aircraft is stowed in the lower stowing position. The different angular placement of the support structures is best evidenced when the embodiment is in a raised position; at this position the lift frame is horizontal and is in essentially parallel relation to the base. When this embodiment is in the raised position, the front support structure is disposed at an angle of 50° in relation to the support frame and base; whereas the rear support structure is disposed at an angle of 38° in relation to the support frame and base. When this embodiment is in the lowered/inclined position, the front support structure is disposed at an angle of 68° in relation to the base and the rear support structure is disposed at an angle of 90° in relation to the base. The given angles are approximations of the actual angular relations.

The lift frame of the second embodiment closely resembles that of the first embodiment. The major difference lies in the attachment of the support structures, which in the second embodiment are both attached towards the rear of the lift frame. Otherwise, the construction of lift frame is generally the same in all other regards.

BRIEF DESCRIPTION OF THE DRAWINGS

FIG. 10 is a side elevational view of a second embodiment of the aircraft storage system in an inclined position depicting the loading of a high-winged aircraft in the upper stowing position while a high-winged aircraft is in the lower stowing position.

FIG. 11 is a side elevational view of the system of FIG. 10 during loading of an aircraft in the upper stowing position;

FIG. 12 is a side elevational view of the system of FIG. 10 in a raised position with high-winged aircraft in both the upper and lower stowing positions;

FIG. 13 is a perspective view of the system of FIG. 10;

FIG. 14 is an enlarged perspective view of the wheel holding means depicted in FIG. 13, FIG. 15 is an enlarged, fragmentary view taken along line 15—15 of FIG. 13; and, FIG. 16 is an enlarged, fragmentary perspective view of one side of an outer wheel track.

DETAILED DESCRIPTIONS OF THE DRAWINGS

Figure 1:
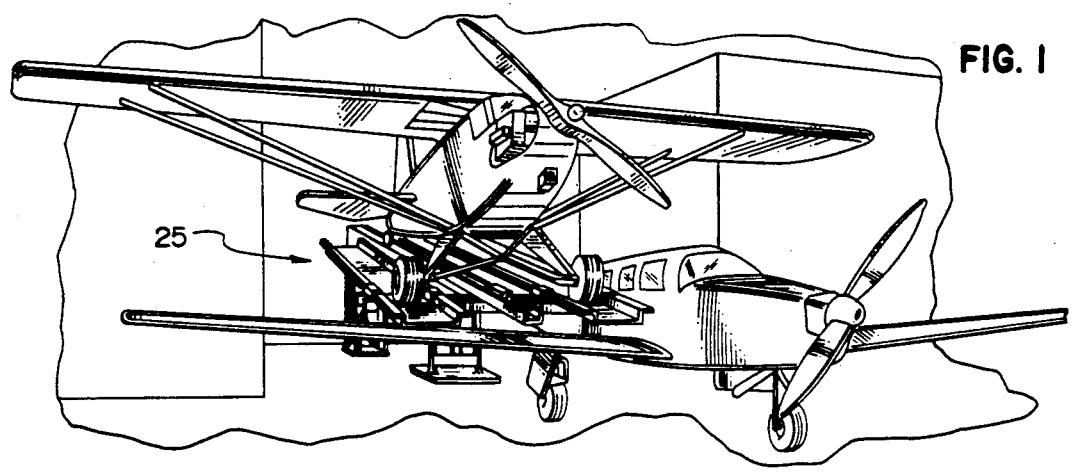
FIG. 1 is a perspective view of one embodiment of the aircraft storage system stowing a low-winged aircraft in the lower stowing position and a high-winged aircraft in the upper stowing position.

Turning now to FIG. 1, therein is depicted one embodiment 25 of the apparatus for lifting and storing aircraft. The improved hangar space utilization is immediately evident. Such increased space utilization is achieved through the stacking or tiered storage arrangement obtained through use of the invention. This apparatus is fully self-supporting and can be installed in pre-existing hangars.

Figure 2:
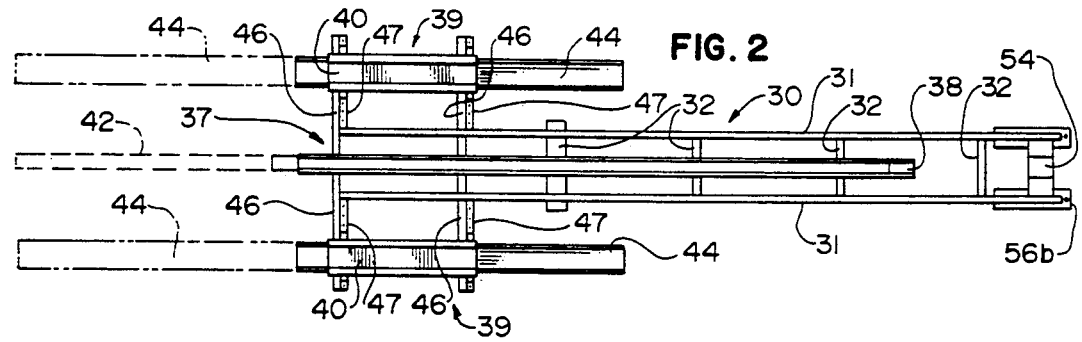
FIG. 2 is a top view of the system of FIG. 1.
Figure 3:
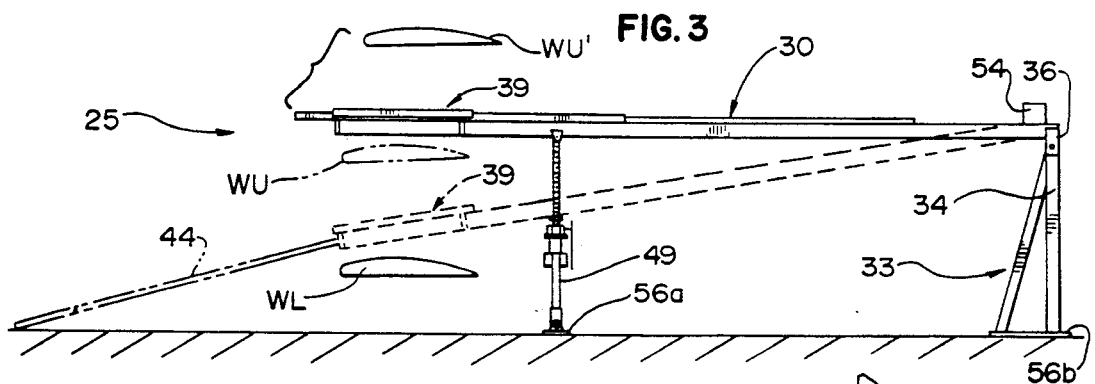
FIG. 3 is a side elevational view of the system of FIG. 1 in the raised position, with the inclined position shown with phantom lines.
Figure 4:
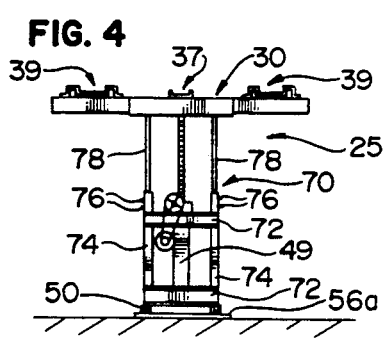
FIG. 4 is a front elevational view of the system of FIG. 1.
Figure 5:
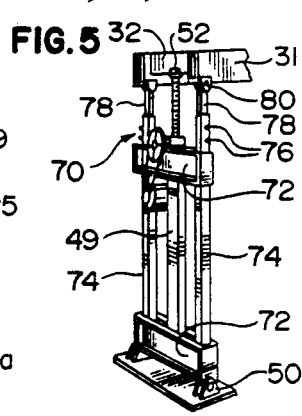
FIG. 5 is a fragmentary perspective view of the lifting means of the system of FIG. 1.
Figure 6:
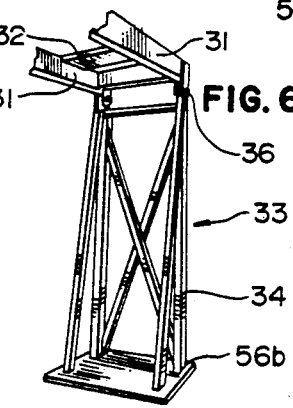
FIG. 6 is a fragmentary perspective view of the rear support structure of the system of FIG. 1.
Figure 7:
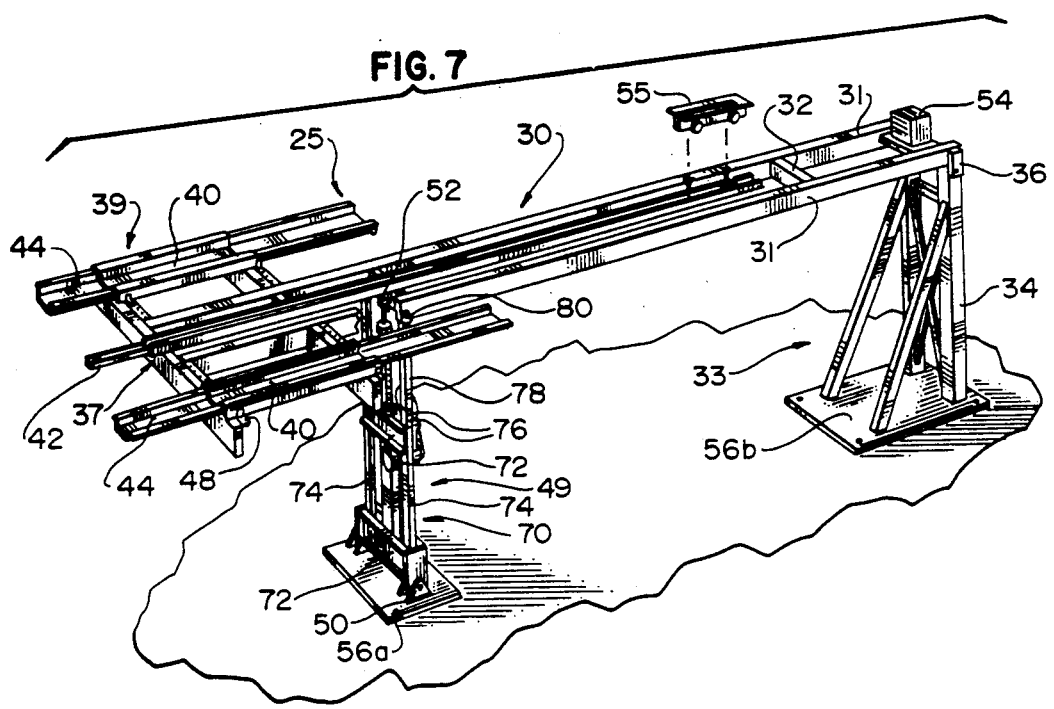
FIG. 7 is a perspective view of the system of FIG. 1.

FIGS. 2, 3 and 7 illustrate the basic construction of this embodiment. The upper section of this embodiment includes the lift frame 30. The inner portion of the lift frame 30 resembles a ladder-like arrangement, which includes a pair of longitudinal beams 31 spaced in parallel relation, and a plurality of lateral connecting beams 32, which are also spaced in parallel relation to one another. A lift frame structure 30 is pivotally attached to a rear support structure, shown generally at 33. The rear support 33 includes a support leg 34, which is pivotally mounted to the frame structure 30 by hinge 36. This arrangement permits the rear support structure of the apparatus to be positioned closely adjacent to the hangar wall, as shown in FIG. 3. The lift frame structure 30 includes a center wheel track assembly 37 and a pair of outer wheel track assemblies 39. The outer wheel track assemblies 39 are positioned in a parallel, adjacent arrangement in regard to the center wheel track assembly 37; one outer wheel track assembly is disposed on each side of the center wheel track assembly. The center wheel track assembly includes a stationary center wheel track 38 and a sliding center wheel track 42. Similarly, the outer wheel track assemblies each include a stationary outer wheel track 40 and a sliding outer wheel track 44.

The outer wheel track assemblies are attached to the lift frame 30 via a pair of adjusting cross members 46. These adjusting cross members 46 are disposed perpendicular to the longitudinal beams 31, the center wheel track assembly 37, and the outer wheel track assemblies 39.

Turning to FIGS. 3-7 the lower regions of this embodiment are depicted. A lift means 49, such as an electric screw jack, is disposed at a forward location on the lift frame 30. This lift means 49 serves to raise and lower the lift frame for loading and unloading of the aircraft stowed in the upper stowing position. This lift means 49 also serves to maintain the lift frame 30 in the raised/horizontal position, lowered/inclined position or positions therebetween.

The rear section of the lift frame 30 is pivotally attached to the stationary support leg 34; thereby permitting angular movement of the lift frame 30 to be actuated by the lift means 49. Lift means 49 is pivotally disposed on a lateral connecting beam 32.

FIG. 3 shows that in order to load an aircraft in the upper stowing position, the lift frame 30 is first moved to the lowered/inclined position, shown in phantom lines, by lowering the lift means 49. The sliding center and outer wheel tracks 42, 44 are then extended so as to permit the forward end of the lift frame 30 to contact the ground. A winch 54, which is positioned at the rear of lift frame 30, includes an extending cable which is connected to wheel caddy 55. Wheel caddy 55, disposed in the stationary center wheel track, retains the center wheel of the aircraft so that the aircraft can be pulled onto the lift frame. Once the aircraft is pulled completely onto the lift frame, the sliding center and outer wheel tracks 42, 44 can then be pushed back to their respective retracted positions. The lift frame is then raised to the raised/horizontal position by extending the lift means 49. Depending on the size of the aircraft, the cable may be connected directly to the aircraft without the use of the wheel caddy. Possible arrangements include connecting the winch cable directly to the center wheel or wrapping a nylon strap or the like around the tail section of the aircraft.

To unload an aircraft from the upper stowing position, the lift frame 30 is moved to the lowered/inclined position by lowering the lift means 49. The sliding center and outer wheel tracks 42, 44 are then extended so as to permit the forward end of the lift frame 30 to contact the ground. Unloading is controlled by keeping the winch cable attached to the plane via the wheel caddy and operating the winch in the reverse, non-pulling mode, and allowing the plane to descend off the ramp under the force of gravity. The winch slows the aircraft as it descends off the ramp. Once the plane is off the ramp, the sliding wheel tracks are pushed back to the retracted position and the lift frame is raised via the lift means.

When the lift frame is in the raised/horizontal position, an aircraft can then be moved into or out of the lower stowing position regardless of whether an aircraft is stowed in the upper stowing position.

FIGS. 3—6 show that this embodiment is anchored to the hangar floor at anchor points 56a and 56b, both of which correspond to the base means for this particular embodiment. Proper movement of the lift frame 30 is permitted by hinge 36 on support leg 34 and hinge points 50 and 52 on the lift means 49. Hinge 50 is disposed at anchor point 56a and hinge point 52 is disposed on a lateral connecting beam 32.

Figure 8:
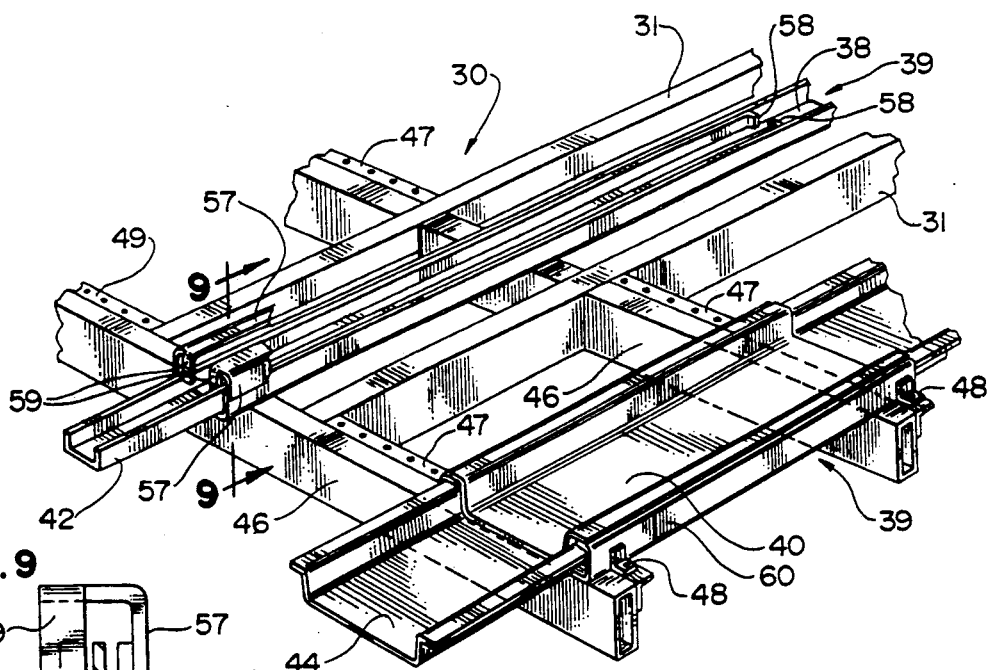
FIG. 8 is an enlarged fragmentary view of the forward sections of the center wheel track and an outer wheel track of the system of FIG. 1.

Turning to FIG. 8, therein are depicted further details of the adjusting cross members 46. A fastening rail 47 is welded, bolted, or otherwise secured to the adjusting cross member 46. The fastening rail 47 runs the entire length of the outer sections of each adjusting cross member 46. The fastening rail 47 contains a plurality of holes for receiving a bolt or pin. Fastening brackets 48 are attached to each outer wheel track assembly 39. Two fastening brackets 48 are positioned on both outside areas of each end of each outer wheel track assembly 39. This arrangement results in a total of four fastening brackets 48 per outer wheel track assembly 39 with two fastening brackets 48 dedicated to each adjusting cross member 46. Adjustment to a variety of wheel bases are possible, such as the 60″, 72″ or 84″ wheel commonly found on presently manufactured aircraft.

The fastening brackets 48 contain a hole which can also receive a bolt or pin. This bolt or pin fastens the fastening bracket 38 and the outer wheel track assembly 39 to the fastening rail 47, which is mounted on the adjusting cross member 46. The plurality of holes located in the fastening rail 47 permit lateral positional adjustment of the outer wheel track assemblies with regard to the center wheel track assembly in order to adapt the apparatus to the landing gear width of the aircraft stowed in the upper stowing position. A similar means of fastening can be accomplished via a sliding means which can be clamped into position.

Figure 9:
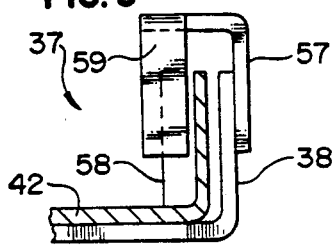
FIG. 9 is an enlarged fragmentary view taken along line 9—9 of FIG. 8.

Turning to FIGS. 8 and 9, therein are also depicted the details of the center wheel track assembly 37. This assembly includes a stationary center wheel track 38, which is attached directly to the central portions of the adjusting cross members 46 and the lateral connecting beams 32. A sliding center track 42 is disposed above and within the stationary center wheel track 38. Retaining sections 57, attached to the length of the stationary center wheel track, retain the sliding track within the stationary track. Holding tabs 58 are positioned at the rear portion of the sliding center wheel track. These tabs 58 contact a holding protuberance 59 when the sliding tack is pulled to an extended position; thereby preventing disengagement of the sliding track from the center wheel track assembly. The holding tabs 58 also serve to prevent the wheel caddy 55 from entering the sliding center wheel track; therefore, the wheel caddy is kept within the stationary center wheel track.

FIGS. 8, 13 and 15-16 depict the details of the outer wheel track assemblies 39. Although FIGS. 13-16 depict the second embodiment of the apparatus for lifting and storing, the outer wheel track assemblies are substantially identical to those found in the first embodiment. A holding channel 60 is attached to the stationary outer wheel track 40 by means such as welding. The fastening bracket 48 is also attached to the holding channel 60. The sliding outer wheel track 44 is disposed beneath the stationary outer wheel track 40 so that the sliding track is between the stationary track and the adjusting cross member 46.

Turning specifically to FIGS. 15 and 16, the interlock tabs of the outer wheel track assembly are most clearly depicted. A first interlock tab 61 is disposed at the rear section of the sliding outer wheel track 44. A second interlock tab 62 is disposed at the forward section of the holding channel 60. These interlock tabs serve as a means of preventing disengagement of the sliding outer wheel track 44 from the outer wheel track assembly 39 when the sliding track 44 is in an extended position.

Turning back to FIGS. 4 and 5, therein are depicted the stabilizing means. Lateral stability of apparatus 25 is enhanced by the addition of a stabilizing means 70 to the lifting means 49. The stabilizing means 70 includes upper and lower horizontal attachment beams 72. These beams are fixedly mounted on the lower portion of the lifting means 49. Left and right stationary vertical stabilizers 74 are disposed at the exterior ends of the horizontal attachment beams 72. The stationary vertical stabilizers 74 can be constructed of box beam or any other suitable conduit-like structure. The uppermost ends of these stationary vertical stabilizers include a pair of threaded apertures for receiving restraining bolts 76. Sliding vertical stabilizers 78, which are of a smaller dimension than the stationary vertical stabilizers 74, are slidingly disposed within the stationary vertical stabilizers. The uppermost ends of these sliding vertical stabilizers 78 are pivotally attached to the longitudinal beams 31 via hinge means 80.

This arrangement results in a telescoping assembly which changes position in conjunction with the movement of the lift frame. Movement is permitted when the restraining bolts 76 re loosened and are not in contact with the sliding vertical stabilizer. After the lift frame is moved to the desired position, usually either the raised/horizontal position or the lowered/inclined position, the restraining bolts 76 are rotated inward so as to tighten the bolts against the sliding vertical stabilizer; thereby impinging or restraining the sliding vertical stabilizer between the restraining bolt and the stationary vertical stabilizer in order to lock the stabilizing means. Lateral stability of the apparatus is enhanced when the stabilizing means is locked.

Turning specifically to FIG. 13, therein are depicted the wheel holding means and its association with means includes a center wheel caddy. 55. The center wheel caddy is necessitated by the need to deep the tensioned winch cable substantially along the line of thrust. Otherwise, the tail section of the aircraft might possible lift out to the center wheel track assembly during loading or unloading of the aircraft.

The center wheel caddy 55 is slidingly disposed within the stationary track 38 of the center wheel track assembly 37. The center wheel caddy is retained within the stationary track by the retaining sections 57 and can travel the length of the stationary track section up to the holding tabs 58 of the sliding rack 42.

FIG. 14 depicts the details of the center wheel caddy 55 itself. The center wheel caddy comprises a caddy frame 81, which can be constructed of conventional angle iron or any other suitable material. The caddy frame is constructed with a centrally disposed wheel holding space 82. The center wheel of the aircraft is placed within the wheel holding space 82 in order to place the aircraft in communication with the winch so that the aircraft can be loaded on or unloaded from the apparatus. At one end of the caddy, a hole 83 is provided for in order to permit connection with the winch cable. Roller wheels 84 provide wheel caddy support and permit smooth travel of the caddy. The caddy also has a plurality of holes 85, 86 to secure the center wheel within the caddy. A wheel retaining means such as rope, chain, cable, brackets or the like is disposed between a hole 85 and a hole 86 while the center wheel is positioned within the wheel holding space of the caddy.

FIGS. 1 and 3 depict the increased hangar space utilization afforded by the use of the apparatus. Either the upper or lower stowed aircraft can be loaded or unloaded by a single person. In addition, such loading or unloading of either aircraft can be undertaken without contacting, moving or disturbing the other accompanying aircraft. FIG. 3 depicts the wing position (WL) of a representative low-winged aircraft in the lower stowing location. Representative wing positions (WU) of a low-winged aircraft in the upper stowing location while the lift frame 32 is an inclined (WU) or raised (WU') position. FIG. 1 shows the high-winged aircraft can be stowed in the upper stowing position.

FIGS. 10-13 depict another embodiment 90 of the apparatus for lifting and stowing aircraft. This embodiment is also fully self-supporting and is also capable of installation in pre-existing hangars. This embodiment 90 uses nearly the same lift frame 30 construction as embodiment 25. The major difference lies in the attachment of the support structures 92a, 92b, which in this second embodiment are both attached towards the rear of the lift frame. Otherwise, the construction of the lift frame is the same as in the first embodiment in all other regards. Therefore, this embodiment includes the center and outer wheel track assemblies (37, 39), the adjusting cross members 46, the fastening rails and brackets 47, 48, and the winch 54.

The support and incline means utilize an arrangement in the nature of a four-bar linkage construction. Forward and rear pivoting support structures 92a, 92b, support the lift frame 30. These support legs 92a, 92b are pivotally attached to support base 94, which is directly anchored to the hangar floor and corresponds to the base means for this particular embodiment. A support extension 94b can be added at the front region of the apparatus in order to increase apparatus stability. A lift means 96, such as an electric screw jack, moves the lift frame 32 to the raised and inclined positions.

The front and rear support structures are disposed at relatively different angles in regard to the support frame and base. Such angular placement of the support structures permits the lift frame 30 to be raised or lowered while an aircraft is stowed in the lower stowing position. The different angular placement of the support structures is best evidenced when the embodiment is in the raised position (FIG. 12); at this position the lift frame is horizontal and is in essentially parallel relation to the base. FIG. 12 shows that when this embodiment is in a raised/horizontal position, the front support structure 92a is disposed at an angle of 50° in relation to the lift frame and base as depicted at 95a. The rear support structure 92b is disposed at an angle of 38° in relation to the support frame and base as depicted at 95b. FIG. 11 shows that when this embodiment is in the lowered/inclined position, the front support structure is disposed at an angle of 68° in relation to the base as depicted at 95c and the rear support structure is disposed at an angle of 90° in relation to the base as depicted at 95d. The given angles are approximations of the actual angular relations.

A top stop 98a, which is attached to the lift frame 30 adjacent to the rearward side of pivoting support 92a, maintains proper lift frame 30 position when the apparatus is inclined. A bottom stop 98b, which is attached to the base 94 adjacent to the rearward side of pivoting support 92b, maintains proper lift frame 30 position when the apparatus is raised.

FIGS. 10-12 depict this embodiment in a hangar (H) in both the raised and inclined positions. In order to load an aircraft and raise it to the upper stowing position, the lift frame 30 is moved to the inclined position by extending the lift means 96. This moves the rear support structure 92b forward, which in turn moves the lift frame 30 and the front support structure 92a; thus resulting in an inclining of the lift frame. The sliding center and outer wheel tracks 42, 44 are then extended so as to permit the forward end of the lift frame 30 to contact the ground. Winch 54, which is positioned at the rear of lift frame 30, includes an extending cable 53 to connect to the wheel caddy 55 and thereby the center wheel of the aircraft in order to pull the aircraft onto the lift frame. Once the aircraft is pulled completely onto the lift frame, the sliding center and outer wheel tracks 42, 44 can then be pushed back to their respective retracted positions. The lift frame is then raised by retracting the lift means 96.

To unload an aircraft from the upper stowing position, the lift frame is moved to the inclined position by extending the lift means 96. The sliding center and outer wheel tracks are then extended so as to permit the forward end of the lift frame to contact the ground. The plane descends off the ramp under the force of gravity. Such unloading is controlled by keeping the center wheel of the aircraft in the wheel holding space of the wheel caddy and operating the winch in the reverse, non-pulling mode. The winch slows the aircraft as it descends. Once the plane is off the ramp, the sliding wheel tracks are pushed back to the retracted position and the lift frame is raised by retracting the lift means 96.

When the lift frame is in the raised position, an aircraft can then be loaded to or unloaded from the lower stowing position regardless of whether an aircraft is stowed in the upper stowing position.

The use of a four-bar linkage type of construction permits high-wing aircraft to be stored in the lower stowing position. Such storage is possible due to the increased clearance of the lift frame at the area of wing location.

It will be appreciated that an apparatus has been provided for lifting and stowing aircraft. These embodiments meet the aforestated objects. Each embodiment stows aircraft in a stacked or tiered arrangement in order to maximize the storage capacity of a given hangar. Each embodiment is designed and constructed so as to permit loading or unloading of aircraft from either the upper or lower stowing locations without moving or disturbing the accompanying aircraft. Each embodiment also permits full operation to be undertaken and completed by one person.

The foregoing has concentrated on the preferred embodiments of the claimed invention. However, it is to be understood that changes in the construction, combination, and arrangement of parts may be resorted to without departing from the spirit and scope of the invention as claimed.

What is claimed is:

1. An apparatus for stowing aircraft comprising:
  a frame structure means for supporting the aircraft, said frame structure means including at least one adjusting cross member, at lest one outer wheel track assembly, and a center wheel track assembly;
  a support means for supporting said frame structure means, said support means including first and second portions disposed on said frame structure means to permit upper and lower stowing positions, said frame structure means being pivotally attached to said support means at said first and second portions, said second portion including lift means for raising and lowering said frame structure means, said lift means including a stabilizing means disposed on said lift means, said stabilizing means including a sliding vertical stabilizer telescopically disposed within a stationary vertical stabilizer and a locking means for locking the stabilizing means whereby stability of the said frame structure is enhanced; and
  a retraction means for pulling the aircraft to a stowed position along said frame structure means, said retraction means disposed on said frame structure means.

2. An apparatus for stowing aircraft comprising:
  a frame structure means for supporting the aircraft, said frame structure means including at least one adjusting cross member, at least one outer wheel track assembly, and a center wheel track assembly, said center wheel track assembly comprising a stationary track section and a sliding track section, said sliding track section being disposed above said stationary track section, and at least one retaining section and at least one holding tab, said retaining section being attached to a length of said stationary track section and said holding tab being attached to a rear region of said sliding track section in order to retain the sliding track section within the stationary track section,
  a support means for supporting said frame structure means, said support means including first and second portions disposed on said frame structure to permit upper and lower stowing positions, said frame structure means being pivotally attached to said support means at said first and second portions, said second portion including lift means for raising and lowering said frame structure means;
  a retraction means for pulling the aircraft to a stowed position along said frame structure means, said retraction means disposed on said frame structure means; and
  a wheel holding means for holding a center wheel of the aircraft and engaging said wheel with said retraction means, said wheel holding means slidingly disposed in said stationary center wheel track.

3. The apparatus of claim 2 wherein said wheel holding means comprises a wheel caddy, said wheel caddy including a frame, a plurality of wheel means, a retracting means attachment point, and means for securing said wheel in said wheel caddy.

4. An apparatus for stowing aircraft comprising:
  a frame structure means for supporting the aircraft;
  a support means for supporting said frame structure means, said support means including forward and rear pivoting supports disposed on said frame structure means at relatively different angles to said frame structure means to form upper and lower stowing positions, said frame structure means pivotally attached to said support means at said forward and rear pivoting supports, said rear pivoting support attached to lift means for raising and lowering said frame structure means, said lift means being disposed underneath said frame structure means;
  a base means for supporting said support means, said forward and rear pivoting supports being pivotally attached to said base means at relatively different angles; and
  a retraction means for pulling the aircraft to a stowed position along said frame structure means, said retraction means disposed on said frame structure means.

5. The apparatus of claim 4 wherein said forward and rear pivoting supports are attached to said frame structure means towards a rear of said frame structure means and angularly disposed on said frame structure means and said base means at said relatively different angles so as to permit said frame structure means to incline.

6. The apparatus of claim 5 wherein said frame structure means includes at least one adjusting cross member and at least one outer wheel track assembly.

7. The apparatus of claim 6 wherein said outer wheel track assembly further comprises a stationary track section and a sliding track section, said sliding track section slidingly disposed between said stationary track section and said adjusting cross member.

8. The apparatus of claim 7 wherein said outer wheel track assembly further comprises at least one fastening bracket, at least one holding channel and a plurality of interlock tabs, said fastening bracket attached to said holding channel, said holding channel attached to said stationary track section and said interlock tabs disposed on the holding channels and the sliding track section.

9. The apparatus of claim 6 wherein said frame structure means includes a center wheel track assembly.

10. The apparatus of claim 9 wherein said center wheel track assembly further comprises a stationary track section and a sliding track section, said sliding track section disposed above said stationary track section.

11. The apparatus of claim 10 wherein said center wheel track assembly further comprises at least one retaining section and at least one holding tab, said retaining section attached to a length of said stationary track section and said holding tab attached to a rear region of said sliding track section in order to retain the sliding track section within the stationary track section.

12. The apparatus of claim 6 wherein said adjusting cross member further comprises a fastening rail having a plurality of holes, said fastening rail engaging said fastening bracket of said outer wheel track assembly to attach said outer wheel track assembly to said adjusting cross member and permit track width adjustment of said frame structure means.

13. The apparatus of claim 4 wherein said lift means is attached to a rear pivoting support and said base means.

14. The apparatus of claim 13 wherein said lift means is a screw jack.

15. The apparatus of claim 4 wherein said base includes anchor means.

16. The apparatus of claim 5 further comprising a top attached to said frame structure means adjacent to a rearward side of the forward pivoting support and a bottom stop attached to said base means adjacent to a rearward side of the rear pivoting support, said top and bottom supports maintaining said frame structure means in the proper raised and inclined positions.

17. An apparatus for stowing aircraft comprising:
a frame structure means for supporting the aircraft, said frame structure means including at least one adjusting cross member, at least one outer wheel track assembly, and a center track assembly, said center wheel track assembly further comprising a stationary track section and a sliding track section, said sliding tract section disposed above said stationary track section, and at least one retaining section and at least one holding tab, said retaining section attached to a length of said stationary track section and said holding tab attached to a rear region of said sliding track section in order to retain the sliding track section within the stationary track section;
a base means for supporting said support means;
a support means for supporting said frame structure means, said support means comprising first and second portions disposed on said frame structure means to form upper and lower stowing positions, said frame structure means pivotally attached to said support means at said first and second portions, said first portion including lift means for raising and lowering said frame structure means, said portions comprising forward and rear pivoting supports, said pivoting supports attached to said frame structure means towards a rear of said frame structure means and angularly disposed on said frame structure means and said base means at relatively different angles so as to permit said frame structure means to incline;
a retraction means for pulling the aircraft to a stowed position along said frame structure means, said retraction means disposed on said frame structure means; and
a wheel holding means for holding the center wheel of the aircraft and engaging said wheel with said retraction means, said wheel holding means slidingly disposed in said stationary center wheel track.

18. The apparatus of claim 17 wherein said wheel holding means comprises a wheel caddy, said wheel caddy including a frame, a plurality of wheel means, a retracting means attachment point, and means for securing said wheel in said wheel caddy.

* * * * *

UNITED STATES PATENT AND TRADEMARK OFFICE
CERTIFICATE OF CORRECTION

PATENT NO. : 5,141,371  Page 1 of 2
DATED : August 25, 1992
INVENTOR(S) : PAUL J. PISH It is certified that error appears in the above-identified patent and that said Letters Patent is hereby corrected as shown below:

In Column 6, line 1, change "tack" to --track--.

line 50, change "re" to --are--.

line 62, between "with" and "means" insert --the center wheel track assembly 37. The wheel holding--.

line 63, delete "." between "caddy" and "55".

line 64, change "deep" to --keep--.

line 66, change "possible" to --possibly--.

line 67, change "to" to --of--.

In Column 7, line 6, change "rack" to --track--.

line 36, change "the" to --that--.

UNITED STATES PATENT AND TRADEMARK OFFICE
CERTIFICATE OF CORRECTION

PATENT NO. : 5,141,371

DATED : August 25, 1992

INVENTOR(S) : Paul J. Pish

It is certified that error appears in the above-identified patent and that said Letters Patent is hereby corrected as shown below:

Column 9, line 19, change "lest" to --least--.

Column 10, line 20, between "to" and "lift" insert --a--.

Col. 11, line 17, after "top" insert the word --stop--.

Signed and Sealed this

Twenty-second Day of June, 1993

Attest:

MICHAEL K. KIRK

*Attesting Officer*       *Acting Commissioner of Patents and Trademarks*